2,536,236

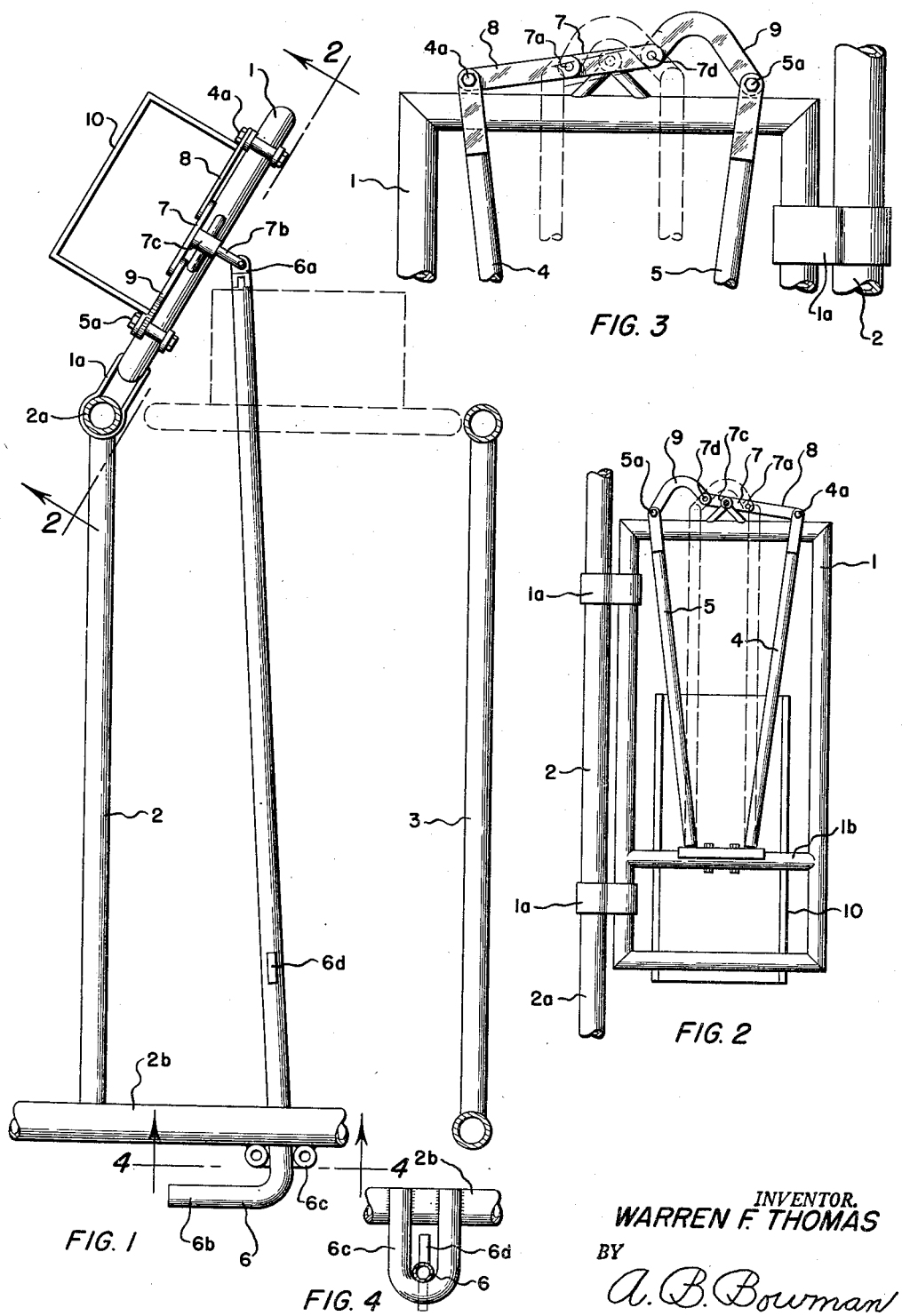
Jan. 2, 1951     W. F. THOMAS     2,536,236
COMBINATION DAIRY STANCHION GATE AND FEEDBOX
Filed Oct. 12, 1946
INVENTOR.
WARREN F. THOMAS
BY
A. B. Bowman
ATTORNEY Patented Jan. 2, 1951

UNITED STATES PATENT OFFICE 2,536,236

COMBINATION DAIRY STANCHION GATE AND FEEDBOX

Warren F. Thomas, Chula Vista, Calif.

Application October 12, 1946, Serial No. 702,962

8 Claims. (Cl. 119—27)

My invention relates to a combination dairy stanchion gate and feed box. The objects of my invention are:

First, to provide a dairy stanchion gate and feed box of this class which permits cows to leave the stall without reversing from the stanchion;

Second, to provide a dairy stanchion gate and feed box of this class in which cows being milked are more speedily handled in maneuvering the cows in and out of the barn in which they are milked;

Third, to provide a dairy stanchion gate and feed box of this class which permits cows to pass out of the barn at the head end of each stall leaving the passage way at the rear end of the stall open for incoming cows, thus avoiding considerable confusion in directing the cows in and out of the barn in which the cows are milked;

Fourth, to provide a combination dairy stanchion gate and feed box in which the stanchion together with the gate at the head end of the stall and the feed box in connection therewith, are all operated by a common control extending rearwardly of the cows position in the stall greatly facilitating the release of cows from the stanchion and the stall at the head end, thereof;

Fifth, to provide a combination dairy stanchion gate and feed box of this class in which the stanchion is readily opened by rotating a control handle extending rearwardly of the cow in the stall whereupon the handle may be forced forwardly for opening the gate with which said stanchion is connected whereby the operator releases the cow from the stall by a control rearwardly of the cow, so that the operator may urge the cow out of the stall in the head foremost direction; and Sixth, to provide a combination dairy stanchion gate and feed box of this class which is very simple and economical of construction, efficient in operation, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a top or plan view of my combination dairy stanchion gate and feed box showing the gate together with the stanchion and feed box in open position and showing parts and portions in section to facilitate the illustration; Fig. 2 is a rear sectional view of the stanchion gate and feed box taken from the line 2—2 of Fig. 1; Fig. 3 is an enlarged fragmentary front elevational view of the stanchion and gate; and Fig. 4 is a fragmentary sectional view taken from the line 4—4 of Fig. 1.

Similar characters of reference refer to similar parts and portions throughout the several views of the drawings.

The gate 1, stall partitions 2 and 3, stanchion bars 4 and 5, handle 6, lever 7, links 8 and 9 and the feed box 10 constitute the principal parts and portions of my combination dairy stanchion gate and feed box.

The gate 1 is a substantially rectangular gate hinged by means of the hinges 1a to a vertical member 2a of the partition 2 as shown best in Figs. 1 and 2 of the drawings. The gate 1 and partitions 2 and 3 are preferably made of pipe or other tubular structure as shown in Fig. 1 of the drawings. The gate 1 is provided with horizontal bar 1b intermediate its end to which the lower end of the stanchion bars 4 and 5 are pivotally connected in spaced relationship to each other as shown best in Fig. 2 of the drawings. Pivotally connected to the upper end of the stanchion bar 4 by means of the pin 4a, is the link 8. The opposite end of this link 8 is pivotally connected to the lever 7 by means of the pin 7a and this link 7 as shown in Fig. 1 of the drawings extends an equal distance in opposite directions laterally of the shaft 7b in connection therewith, which is journaled by a bearing 7c immovably connected to the upper end of the gate 1. Pivotally connected to the opposite end of the lever 7 by means of the pin 7d is the link 9. The opposite end of this link 9 is pivotally connected to the upper end of the stanchion bar 5 by means of the pin 5a. It will be noted that the link 9 is a curved link arranged to pass over the axis of the bearing 7c when the lever 7 is rotated substantially 180 degrees from the position shown in Fig. 2 of the drawing to the dash line position shown therein. Pivotally connected to the shaft 7b is the universal joint 6a secured to the handle 6. This handle 6 extends rearwardly to a position near the rear end of the stall intermediate the partitions 2 and 2 and is provided with an angularly disposed handle portion 6b. The handle 6 adjacent its handle portion 6b is supported by a substantially U-shaped bracket 6c as shown in Fig. 4 which is secured to the horizontal support member 2b preferably connected to the partitions 2 and 3. The handle 6 is provided with a protruding lug 6d arranged to be reciprocally passed through the bracket 6c and rotated substantially 180 degrees into the dash line position rearwardly of the bracket 6c for holding the gate 1 in the dash line position as shown in Fig. 4 of the drawings. The feed box 10 is secured at the outer side of the gate 1, outwardly of the stanchion bars 4 and 5 and is arranged to hold feed therein which may be eaten by the cow when the cow is held by the stanchion bars 4 and 5 in the dash line position as shown in Fig. 2 of the drawings.

The operation of my combination dairy stanchion and feed box is substantially as follows:

When it is desired to milk a cow, the cow is driven into the stall partitions 2 and 3, and the gate 1 is maintained in the dash line position as shown in Fig. 1 of the drawings. Stanchion bars 4 and 5 are maintained in the solid line position as shown in Fig. 2 permitting the cow to insert her head through the stanchion bars 4 and 5 and feed upon the contents in the feed box 10. After the cow has placed her neck between the stanchion bars 4 and 5, the handle 6 is rotated in a counterclockwise direction substantially one hundred eighty degrees, thereby moving the lug 6d into the dash line position as shown in Fig. 4 of the drawing, wherein the lug 6d engages the bracket 6c at the rear, thereof, holding the gate 1 closed as shown by dash lines in Fig. 1 of the drawings. During rotation of the handle 6 the universal joint 6a transfers rotary motion to the shaft 7b which pivots the lever 7 substantially 180 degrees forcing the stanchion bars 4 and 5 in connection with the links 8 and 9 into the dash line position as shown in Fig. 2 of the drawings, wherein the link 9 passes over the axis of the bearing 7c secured to the upper end of the gate 1. In this position the pivotal axis of the links 8 and 9 in connection with the lever 7 pass over center effectively locking the stanchion bars 4 and 5 against lateral separating movement relatively to each other. After milking the cow the stanchion bars 4 and 5 may be released to the solid line position as shown in Fig. 2 of the drawings by rotating the handle 6 in a clockwise direction substantially 180 degrees pivoting the lever 7 in connection therewith together with the links 8 and 9, and aligning the lug 6d of the handle 6 with the opening in the member 6c, as shown in Figs. 1 and 4. The handle 6 may then be pushed toward the gate 1, forcing the same to swing on the hinges 1a and pivot to the solid line position as shown in Fig. 1 of the drawings; whereupon the cow may be urged forwardly out of the stall intermediate the partitions 2 and 3 at the head end of the stall.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. The combination of a hinged gate pivoted on a vertical axis, stanchion bars pivoted on said gate and a feed box secured on and wholly supported by said gate outwardly of said stanchion bars.

2. The combination of a hinged gate, stanchion bars pivoted on said gate and a feed box secured on said gate outwardly of said stanchion bars, a control handle pivoted on said gate and extending rearwardly thereof, provided with a universal joint, a shaft connected to said universal joint, a lever connected to said shaft, and a pair of links individually connected with said stanchion bars, whereby said gate may be opened and closed and said stanchion bars may be opened and closed relatively to each other by operating said control handle.

3. The combination of a hinged gate, stanchion bars pivoted on said gate and a feed box secured on said gate outwardly of said stanchion bars, a control handle pivoted on said gate and extending rearwardly thereof, provided with a universal joint, a shaft connected to said universal joint, a lever connected to said shaft, and a pair of links individually connected with said stanchion bars, whereby said gate may be opened and closed and said stanchion bars may be opened and closed relatively to each other by operating said control handle, said handle having means for longitudinally fixing the same in certain position.

4. In a combination dairy stanchion gate and feed box of the class described a hinged gate adapted to be positioned at the head of a stall, a pair of stanchion bars pivoted on said gate and control means for opening and closing said stanchion bars and opening and closing said gate, said means including an elongated handle member and universal joint connected to said handle member.

5. In a combination dairy stanchion gate and feed box of the class described a hinged gate adapted to be positioned at the head of a stall, a pair of stanchion bars pivoted on said gate and control means for opening and closing said stanchion bars and opening and closing said gate, said means including an elongated handle member and universal joint connected to said handle member, a shaft connected to said universal joint, a lever connected to said shaft, and links pivotally connecting said lever with the upper ends of said stanchion bars.

6. In a combination dairy stanchion gate and feed box of the class described a hinged gate adapted to be positioned at the head of a stall, a pair of stanchion bars pivoted on said gate and control means for opening and closing said stanchion bars and opening and closing said gate, said means including an elongated handle member and universal joint connected to said handle member, a shaft connected to said universal joint, a lever connected to said shaft, and links pivotally connecting said lever with the upper ends of said stanchion bars, means connected to said handle member for securing the same against longitudinal movement.

7. The combination of a hinged gate, stanchion bars pivoted on said gate, a control handle, a universal joint connected therewith, a pair of links individually connected with said stanchion bars, an intermediate link connected with said universal joint and connected with said first-mentioned links at its opposite ends, said control handle extending rearwardly of said gate to a position near the rearward portion of a stall communicating with said stanchion bars.

8. The combination of a hinged gate, stanchion bars pivoted on said gate, a control handle, a universal joint connected therewith, a pair of links individually connected with said stanchion bars, an intermediate link connected with said universal joint and connected with said first-mentioned links at its opposite ends, said control handle extending rearwardly of said gate to a position near the rearward portion of a stall communicating with said stanchion bars, bearing means in which said handle reciprocates, and means for longitudinally fixing said handle relative to said bearing means.

WARREN F. THOMAS.

REFERENCES CITED

The following references are of record in the file of this patent:

UNITED STATES PATENTS

| Number | Name | Date |
|---|---|---|
| Re. 22,657 | Babson et al. | Aug. 7, 1945 |
| 968,104 | Woodmancy | Aug. 23, 1910 |
| 1,381,006 | Pitlick | June 7, 1921 |
| 1,427,224 | Moffatt et al. | Aug. 29, 1922 |
| 1,483,292 | Fitzgerald | Feb. 12, 1924 |
| 1,621,760 | Stader et al. | Mar. 22, 1927 |
| 1,843,328 | Kvenvold | Feb. 2, 1932 |
| 1,928,819 | Neller | Oct. 3, 1933 |
| 1,934,177 | Ferris | Nov. 7, 1933 |
| 2,396,928 | Parsons | Mar. 19, 1946 |